United States Patent [19]

Hannah

[11] Patent Number: 4,951,232

[45] Date of Patent: Aug. 21, 1990

[54] METHOD FOR UPDATING PIPELINED, SINGLE PORT Z-BUFFER BY SEGMENTS ON A SCAN LINE

[75] Inventor: Marc R. Hannah, Menlo Park, Calif.

[73] Assignee: Silicon Graphics, Inc., Mountain View, Calif.

[21] Appl. No.: 243,427

[22] Filed: Sep. 12, 1988

[51] Int. Cl.$^5$ ............................................. G06F 15/72
[52] U.S. Cl. .................................... 364/522; 340/729
[58] Field of Search ....................... 364/518, 521, 522; 340/729

[56] References Cited

U.S. PATENT DOCUMENTS

| 4,769,636 | 9/1988 | Iwami et al. | 364/522 X |
| 4,791,567 | 12/1988 | Cline et al. | 364/522 X |
| 4,791,582 | 12/1988 | Ueda et al. | 364/522 |

OTHER PUBLICATIONS

Ohhashi et al., *A 32b 3-D Graphic Processor Chip with 10M Pixels/s Gouraud Shading*, 1988 IEEE International Solid-State Circuits Conference, p. 168, (Feb. 18, 1988).

*Primary Examiner*—Gary V. Harkcom
*Assistant Examiner*—Mark K. Zimmerman
*Attorney, Agent, or Firm*—Blakely, Sokoloff, Taylor & Zafman

[57] ABSTRACT

A method for updating a single ported, pipelined Z-buffer where the Z-buffer is updated only after determining the beginning and ending location of a continuous group of pixel locations requiring updating in the Z-buffer.

4 Claims, 3 Drawing Sheets

FIG_1 (PRIOR ART)

FIG_2

FIG_3

FIG_4

| OPERATION OR STATUS | TIME → TIME PERIOD | | | | | | | | | | | | | | | |
|---|---|---|---|---|---|---|---|---|---|---|---|---|---|---|---|---|
| | T1 | T2 | T3 | T4 | T5 | T6 | T7 | T8 | T9 | T10 | T11 | T12 | T13 | T14 | T15 | T16 |
| READ (R) OR WRITE (W) Z | R D1 | R D2 | R D3 | R D4 | R D5 | R D6 | R D7 | | W D3 | W D4 | W D5 | | R D7 | R D8 | R D9 | R D10 |
| COMPARE Z | | D1 | D2 | D3 | D4 | D5 | D6 | | | | | | | D7 | D8 | D9 |
| WRITE PIXEL | | | | | D3 | D4 | D5 | | | | | | | | | |
| $\overline{WE}$ FOR Z-BUFFER | | | | | | | | | | | | | | | | |

FIG_5

METHOD FOR UPDATING PIPELINED, SINGLE PORT Z-BUFFER BY SEGMENTS ON A SCAN LINE

BACKGROUND OF THE INVENTION

The invention relates to a raster scan, computer controlled video display system for presenting an image to an observer on a video display apparatus, which system includes a Z-buffer for storing Z values to enable the computer controlled video display system to present a 3-dimensional representation of an image to the observer. More specifically, the invention relates to a method for updating the Z-buffer with new Z values to replace old Z values.

Figure 5:
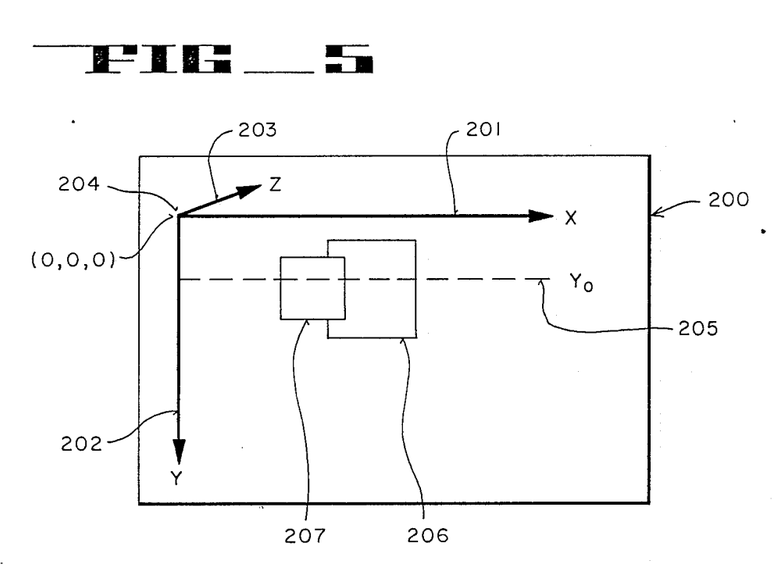
FIG. 5 shows diagrammatically the screen of a video display apparatus which is coupled to receive converted pixel values from the frame buffer 10.

Computer controlled video display systems which utilize the conventional raster scan technique in their operation, present a 3-dimensional representation of an image to an observer by, among other things, utilizing a Z-buffer which contains the information that indicates whether one object on the screen is in front of or behind another object. That is, the Z-buffer contains information for each pixel on the screen to indicate whether the object will be hidden (e.g. when behind another object or surface) or can be seen. FIG. 5 shows a screen 200 of a video display apparatus, such as a conventional RGB video monitor or a liquid crystal display device. An orthogonal coordinate system having X, Y and Z axes is shown overlaid onto the video screen 200. It will be appreciated that such axis (i.e. X axis 201, Y axis 202 and Z axis 203) will not normally appear on the screen 200 during normal operation of the computer controlled video display system. The origin 204 of the axis is shown in the upper left corner of the display area and has been assigned the coordinate (0, 0, 0). It will be understood that the screen 200 of the video display apparatus is coupled in the conventional manner to a computer controlled display system to receive the pixel values (after digital to analog conversion) from the frame buffer, which pixel values represent the color and intensity for each pixel in the image.

In the conventional raster scan technique ("rasterization"), each row of pixels, such as row 205 is drawn as the electron beam of the video display apparatus is scanned from the far left edge of the row to the far right edge of the row. Thus, for example row Yo, shown as row 205, will be scanned from X=0 to the maximum value of X ($X_{max}$).

These conventional computer controlled video display systems typically have a frame buffer and a Z-buffer. The frame buffer is a memory (e.g. DRAM or SRAM) which holds the digital representation of the color and intensity for each pixel in the image. The frame buffer is also referred to as a video bitmap. The Z-buffer is a memory that holds one number for each pixel in the frame buffer. The value of this number indicates the distance between the observer and the object being displayed at the pixel. As shown in FIG. 5, a small Z value indicates that the object is closer to the observer. Conversely, it is possible to have a system where a large Z value indicates that the object is closer to the observer.

Figure 1:
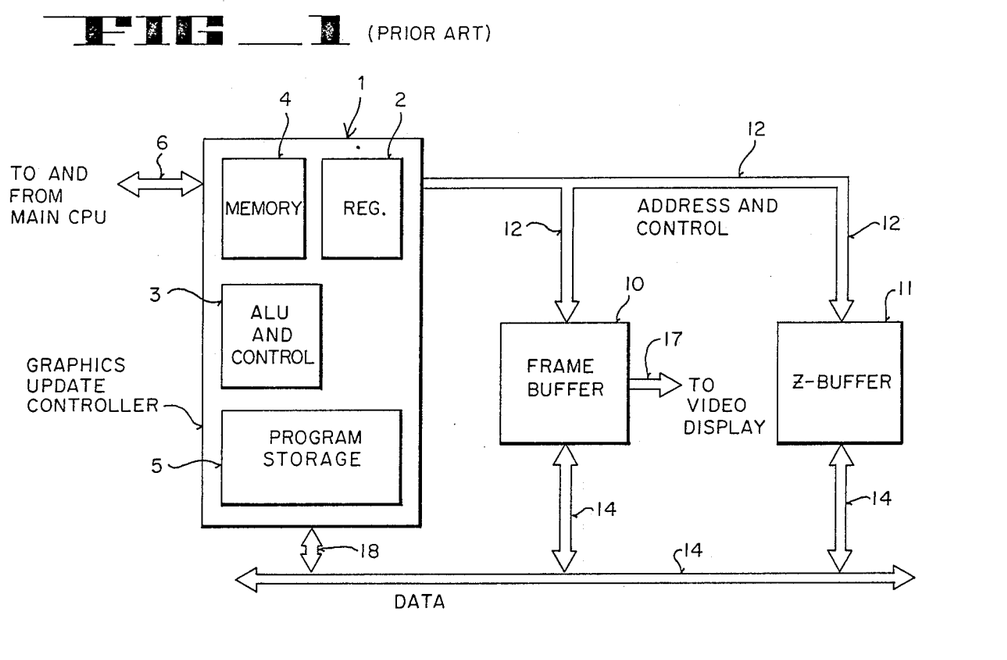
FIG. 1 is a schematic diagram of a prior art graphics system of a computer workstation for use in a computer controlled video display system.

The conventional process of updating a Z-buffer according to the prior art will now be described with reference to FIG. 1. FIG. 1 shows in block diagram form a high performance graphics system which is part of a computer system. The graphics subsystem includes a graphics update controller 1 and a frame buffer 10 and a Z-buffer 11. The graphics update controller 1 of FIG. 1 controls the updating of the frame buffer 10 and the updating of the Z-buffer 11; the graphics subsystem shown in FIG. 1 is a conventional system found on high performance workstations such as the IRIS 4D/60 workstation marketed by the Assignee of the present invention. Other well known graphics subsystems utilizing a Z-buffer along with a frame buffer are well known and operate in a similar manner as the graphics subsystem shown in FIG. 1.

For a group of pixels in a scan line ("row"), the graphics update controller 1 calculates new pixel values and new Z values for each pixel location across the group of pixels in the scan line, which typically includes a plurality of pixel locations. The graphics update controller 1 will typically calculate new pixel and Z values for an entire scan line. For example, if each scan line includes 512 pixel locations (i.e. X may have a value equal to any integer between and including 1 to 512) then the graphics update controller 1 calculates in the conventional manner a new pixel value and a new Z value for each pixel location. Each pixel location already displayed on the display apparatus will have an old Z value and an old pixel value which are stored respectively in the Z-buffer and the frame buffer. For each pixel location the graphics update controller 1 performs the following four steps. Firstly, the graphics update controller 1 reads the old Z value in the Z-buffer 11 which corresponds to the current pixel which is being or has been computed. Secondly, the graphics update controller 1 compares the old Z value read from the Z-buffer 11 to the new Z value being calculated for the current pixel location to determine if the current pixel being calculated is closer to the observer than the pixel already stored in the frame buffer 10. Thirdly, the new pixel value is written into the frame buffer for the current pixel location if the new pixel for that pixel location is closer to the observer than the pixel already stored in the frame buffer 10. That is, in a typical implementation, the graphics update controller 1 determines whether the new Z value for the current pixel location is less than the old Z value for that pixel location; if it is less than, then the graphics update controller 1 addresses the appropriate pixel location for the current pixel via address and control bus 12 while supplying the new pixel value over the data buses 14 and 18. In the fourth step, the graphics update controller 1 writes the new Z value for the current pixel location into the Z-buffer 11 when the new pixel at that location is closer to the observer than the old pixel which was stored in the frame buffer 10. If the new Z value is not less than the old Z value, then no changes are made to the old pixel value and old Z value in the buffers (because the old pixel is in front of the new pixel) and the graphics update controller moves to the next pixel location.

This four step process is then repeated for the next pixel. Thus, for the next pixel location, the new pixel value is computed along with the new Z value for that pixel. Then, the old Z value is read from the Z-buffer 10 and compared to the new Z value to determine whether, for that pixel location, the new pixel is closer to the observer than the old pixel. If the new pixel is closer than the old pixel, then the frame buffer is updated with the new pixel value and the Z-buffer is updated with the new Z value. It will be appreciated from the graphics subsystem shown in FIG. 1, that since the frame buffer 10 and the Z-buffer 11 share a data bus 14 and an address and control bus 12, that only one buffer can be read from or written to at one point in time. In this invention, a graphics subsystem architecture is disclosed that allows the first three steps to be pipelined so that all three may occur simultaneously or substantially simultaneously for different pixels. Moreover, according to the method of the present invention, the Z-buffer is updated only after determining the existence of a contiguous group of pixel locations requiring updating of the Z-buffer. This method reduces the amount of additional time required to update the Z-buffer and hence improves the speed with which images may be manipulated and viewed on the video display system. Before discussing the detailed architecture and method of the present invention, it will be instructive to describe the architecture of the prior art graphics subsystem shown in FIG. 1.

Prior art graphic subsystems that use a Z-buffer typically have an architecture such as that shown in FIG. 1. One distinguishing feature of this prior art architecture is that the Z-buffer and frame buffer share a common data bus and also share a common address and control bus. Thus, frame buffer 10 and Z-buffer 11 share the common data bus 14 and also share the common address and control bus 12. In this prior art system, the graphics update controller performs all four of the steps described above for one pixel before moving on to the next pixel. The frame buffer 10 and Z-buffer 11 are refreshed if they are dynamic RAM (DRAM) using conventional, well known memory refresh techniques which are performed by the graphics update controller 1. The video display apparatus is also refreshed by conventional, well known video refresh techniques that are performed by the graphics update controller 1 which accesses pixels from the frame buffer and outputs them through bus 17 to conventional video display circuitry (e.g. digital to analog converters) and the video display apparatus such as a computer monitor. In order not to unnecessarily obscure the details of the present invention, such conventional, well known circuitry will not be described herein.

The graphics update controller 1 may be a general purpose microprocessor or a more specifically designed graphics controller chip which receives commands and graphics data from the main CPU of the computer through bus 6. The main CPU will typically provide a command such as drawing a line along a scan line from a starting X location to an ending X location along that scan line, which command will be recognized by the graphics update controller 1. In addition, the main CPU will provide certain graphics data which is stored in the register 2, which data typically includes the original pixel value (pixel$_s$) for the first pixel to be drawn (which pixel value represents digitally the color and intensity of the first pixel), and the starting X, Y, and Z locations of the original pixel ($X_s$, $Y_s$ and $Z_s$), and the ending X location and the change in Z (delta Z) and the change in the pixel value (delta pixel) over the length of the line being drawn by the graphics update controller 1. The command being stored in register 2 may be subroutine entry values in the program storage 5 which values the ALU and control unit 3 retrieves from register 2 and uses to enter the appropriate subroutine in the program storage 5. The memory 4 in graphics update controller 1 is utilized as a scratch pad memory and to receive the new computed values for the new pixel and the new Z value for each pixel location. The bus 6 typically includes a conductor means which indicates to the main CPU a wait state while the graphics update controller 1 processes the previous command from the beginning X value to the ending X value. While the wait state is active, the main CPU refrains from supplying further commands and graphics data to the graphics update controller 1.

The graphics update controller 1 in a typical prior art implementation will calculate, for each pixel location after the first pixel location $X_s$, a new pixel value by adding for each pixel location the delta pixel value to the pixel value in the prior pixel location. Thus, for example, for the pixel location $X_s+1$ the pixel value will be pixel$_s$+delta pixel; for the second pixel location at pixel location $X_s+2$, the pixel value will be pixel$_s+2$ (delta pixel). This incremental addition of delta pixel to each proceeding pixel value will continue through the whole range of X's which the main CPU has specified will be drawn for a particular row or portion of a row of pixels. The new Z-buffer values are calculated by adding delta Z to each preceding Z value, where the starting Z value is $Z_s$. After calculating the new Z value for a particular pixel location, the old Z value is read from the Z-buffer 11 by presenting the address for that Z value on the address and control bus 12, thereby causing the output of the old Z value for that pixel location through data bus 14 and bus 18 into the graphics update controller 1. The old Z value for the particular pixel location is then compared to the new Z value for that particular pixel location. If the pixel just calculated (with its corresponding new pixel value) is closer to the observer than the pixel already in the frame buffer, then the frame buffer 10 is updated with the new pixel value and the Z-buffer 11 is updated with the new Z value. Thus, in a typical implementation, the ALU and control unit 3 reads the old Z value and compares the new and old Z values to determine whether the new Z value is less than the old Z value for the particular pixel location being updated. If the new Z value is not less than the old Z value then the pixel value in frame buffer 10 is not updated and similarly the old Z value in Z-buffer 11 for that pixel location is not updated. However, if the new Z-buffer value for the current pixel location is less than the old Z value for that pixel location then the ALU and control unit 3 causes the address corresponding to that pixel location to be applied through address and control bus 12 to the frame buffer 10 while the pixel value is applied to data bus 14 through bus 18 to thereby write the new pixel value into the frame buffer 10 at the appropriate location. Then, the Z-buffer is updated by the graphics update controller 1 when the ALU and control unit 3 causes the appropriate address of the Z value for that pixel location to appear on the address and control bus 12 while the new Z data is presented over buses 18 and then the data bus 14, thereby writing the new Z value into the Z-buffer 11. After updating the frame buffer 10 and the Z-buffer 11, the graphics update controller 1 moves to the next pixel location for the same four steps described above, unless the graphics update controller 1 has finished executing the last command, in which case it deactivates the wait state signal to the main CPU and looks for the next command and graphics data from the main CPU.

The prior art graphics system shown in FIG. 1 is typically found on high performance graphics workstations, such as the IRIS 4D/60. These graphics systems while providing high performance, suffer from the fact that only one buffer (either the frame buffer or the Z-buffer) can be addressed and only one buffer can output data or receive data at the same time. Moreover, the operations of the four steps described above are performed sequentially for each pixel location and then performed again for each subsequent pixel location with no overlapping or interleaving of operations to provide for parallel processing. Graphics architectures have been described which solve these problems by utilizing a separate address and control line for the frame buffer which is distinct from the address and control line for the Z buffer while also utilizing a dual port Z-buffer having a port for Z data in and a port for Z data out (see, for example, the article entitled "A 32b 3-D Graphic Processor Chip with 10M Pixels/S Guaraud Shading", 1988 IEEE International Solid-State Circuits Conference, pp. 168–169, 132). However, these graphics processing chips fail to efficiently overlap operations and are also more costly than a single ported Z-buffer because fewer buses are required and typically cheaper memory chips are available for single ported memory applications.

Accordingly, it is an object of the present invention to provide an efficient graphics architecture that utilizes parallel operations which are overlapped (interleaved) to increase the speed of the unit while at the same time providing a cost efficient architecture and method for updating a single ported Z-buffer memory.

SUMMARY OF THE INVENTION

A method and architecture for updating a pipelined, single ported Z-buffer is disclosed for use in a raster scan, computer controlled video display system for presenting a 3-dimensional representation of an image on a video display apparatus, such as a computer monitor, to an observer of the video display apparatus. The computer controlled video display system includes a Z-buffer for storing Z values and a frame buffer for storing pixel values. The Z-buffer has a single, bi-directional data port which is coupled to a graphics update controller which is substantially similar to the prior art graphics update controller. The frame buffer may be a single port random access memory or a dual port random access memory.

The method of the invention for updating the Z-buffer with new Z values to replace the old Z values begins with the calculation of a new Z value and a new pixel value for each pixel location in a plurality of pixel locations, which is typically across a scan line or a portion of the scan line which is scanned in the raster scan technique. Each of the pixel locations has associated therewith an old Z value and an old pixel value which are stored respectively in the Z-buffer and in the frame buffer. The Z values represent the closeness to the observer of a pixel displayed on the video display apparatus. For each new Z value which is computed, a Z comparison is performed in which the old Z value is compared with the new Z value to determine whether for that pixel location, the new Z value is in front of or behind the old Z value. The Z comparison is performed sequentially through the plurality of pixel locations, which is typically across a row of the raster scanned video display apparatus. The Z comparison for a particular pixel location will produce a fail condition when the old Z value at that particular pixel location represents a pixel being closer to the observer than the new pixel at that particular pixel location. For example, when lower Z values indicate pixels being closer to the observer, a fail condition exists when the old Z value is less than the new Z value. The Z comparison will produce a pass condition for a particular pixel location when the new pixel at that particular pixel location is closer to the observer than the old pixel being represented by the old Z value.

According to the method of the present invention, the Z-buffer is updated only after the Z comparison produces a combination of a fail condition for the current pixel location which is subsequent to producing a pass condition for the pixel location immediately preceding the current pixel location. The pixel location immediately preceding the current pixel location will be the last pixel location in a contiguous group of pixel locations having a pass condition (almost always a contiguous (uninterrupted by pixels with a fail condition) plurality of pixel locations will require updating, unless Z values are unusually erratic). The Z-buffer will be updated for the contiguous group of pixel locations having a pass condition, which contiguous group ends with the pixel location immediately preceding the current pixel location. Such updating of the Z-buffer occurs only after the combination of a fail condition which follows a pass condition.

The method of the invention will typically determine a first update pixel location, which first update pixel location will be the position of where to begin an updating of the Z-buffer with new Z values for a contiguous group of pixel locations having a pass condition. The step of determining the first update pixel location includes determining when two consecutive first and second Z comparisons for a first and second pixel location along the same scan line produce a fail and a pass condition respectively. That second pixel location will be the first update pixel location. The case of the first pixel location in a scan line (i.e. $X=1$) is a special circumstance in this step of determining the first update pixel location. In this circumstance, if the Z comparison for the first pixel location ($X=1$) is a pass condition, then that first pixel location is the first update pixel location. The method of the invention then determines the last update pixel location, which location will be the end of updating of the Z-buffer. That step of determining the last update pixel location includes determining when two consecutive third and fourth Z comparisons for a third and fourth pixel location along the same scan line produce a pass and a fail condition respectively. The third pixel location will be the last update pixel location. The case of the last pixel location in a scan line is a special circumstance in this step of determining the last update pixel location. In this circumstance, if the Z comparison for the last pixel location in a scan line is a pass condition, then that last pixel location is the last update pixel location. According to the method of the present invention, the Z-buffer will be updated with new Z values for the continuous group of pixel locations after determining the last update pixel location rather than after each Z comparison. The updating of the Z-buffer will be performed for all Z values associated with the contiguous group of pixels (between and including the first and last update pixel locations) immediately after determining the last update pixel location.

DETAILED DESCRIPTION OF THE PREFERRED EMBODIMENT

The subject invention will be described with reference to the preferred embodiment and the accompanying figures which illustrate the invention. The following description is illustrative of the invention and is not to be construed as limiting the invention. Numerous specific details are described to provide a thorough understanding of the subject invention. In other instances, certain well known or conventional details are described briefly in order not to unnecessarily obscure the present invention in detail. In the drawings, like elements are labelled with like reference numerals.

Figure 2:
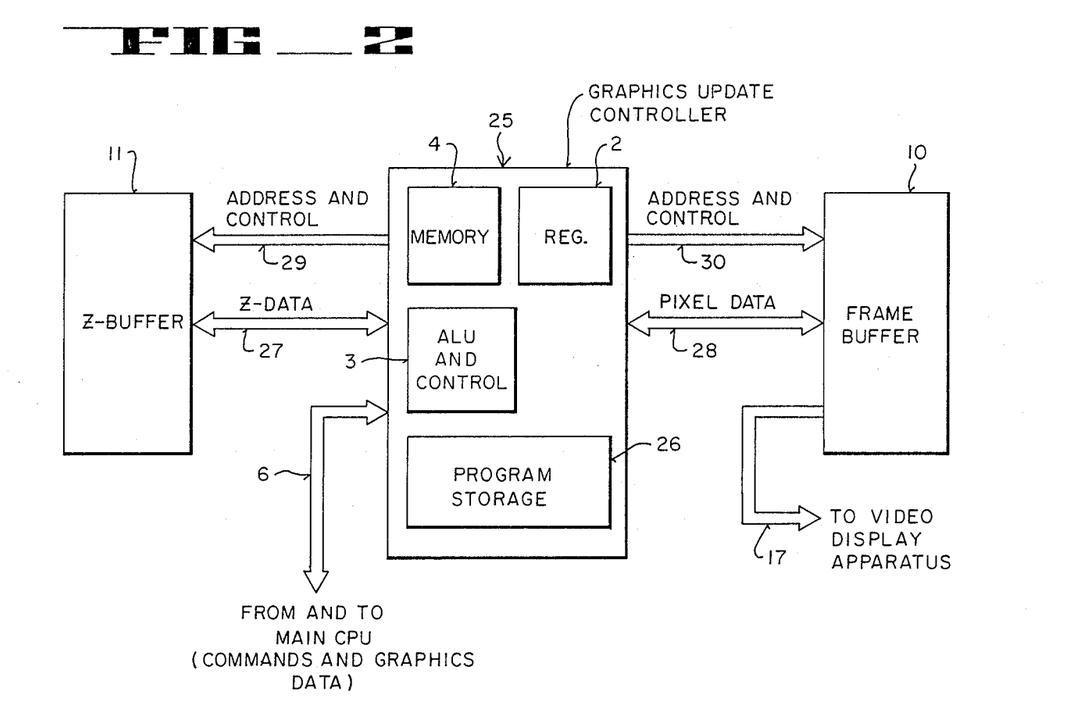
FIG. 2 is a schematic diagram of the architecture of the graphics system of a computer controlled video display system where the Z-buffer is single ported and is updated utilizing the method of the invention.

FIG. 2 shows the architecture of the graphics system which performs the method of the invention. The graphics controller 25 contains the same basic elements arranged in the same way as the graphics controller 1 shown in FIG. 1, except that the program storage 26 of the graphics update controller 25 contains a control program which includes the process shown in FIG. 3 which implements the efficient method of updating the Z-buffer according to the present invention. Thus, the graphics update controller 25 includes memory 4 which is used as a scratch pad to receive values and hold them. The graphics update controller 25 further includes registers 2 which serve to store the graphics data and commands received from the main CPU along bus 6, and the graphics update controller 25 includes an ALU and control unit 3 which operates under the control of the program stored in the program storage 26 to manipulate the data stored in the registers 2 based upon the commands supplied by the main CPU through bus 6. As with the prior art graphics update controller 1, the graphics update controller 25 uses conventional, well known memory refresh and video refresh techniques. The frame buffer 10 is coupled to the video display apparatus by the bus 17. A bi-directional bus 27 provides Z data to and from the Z-buffer 11. The data bus 28 is coupled between the graphics update controller 25 and the frame buffer 10 to provide pixel values to and from the frame buffer 10. As shown in FIG. 2 the frame buffer 10 is a dual ported dynamic random access memory (DRAM); alternatively, static random access memory (SRAM) may be utilized for either or both of the buffers 10 and 11; such an implementation would reduce the need for and expense of memory refresh circuitry.

Figure 3:
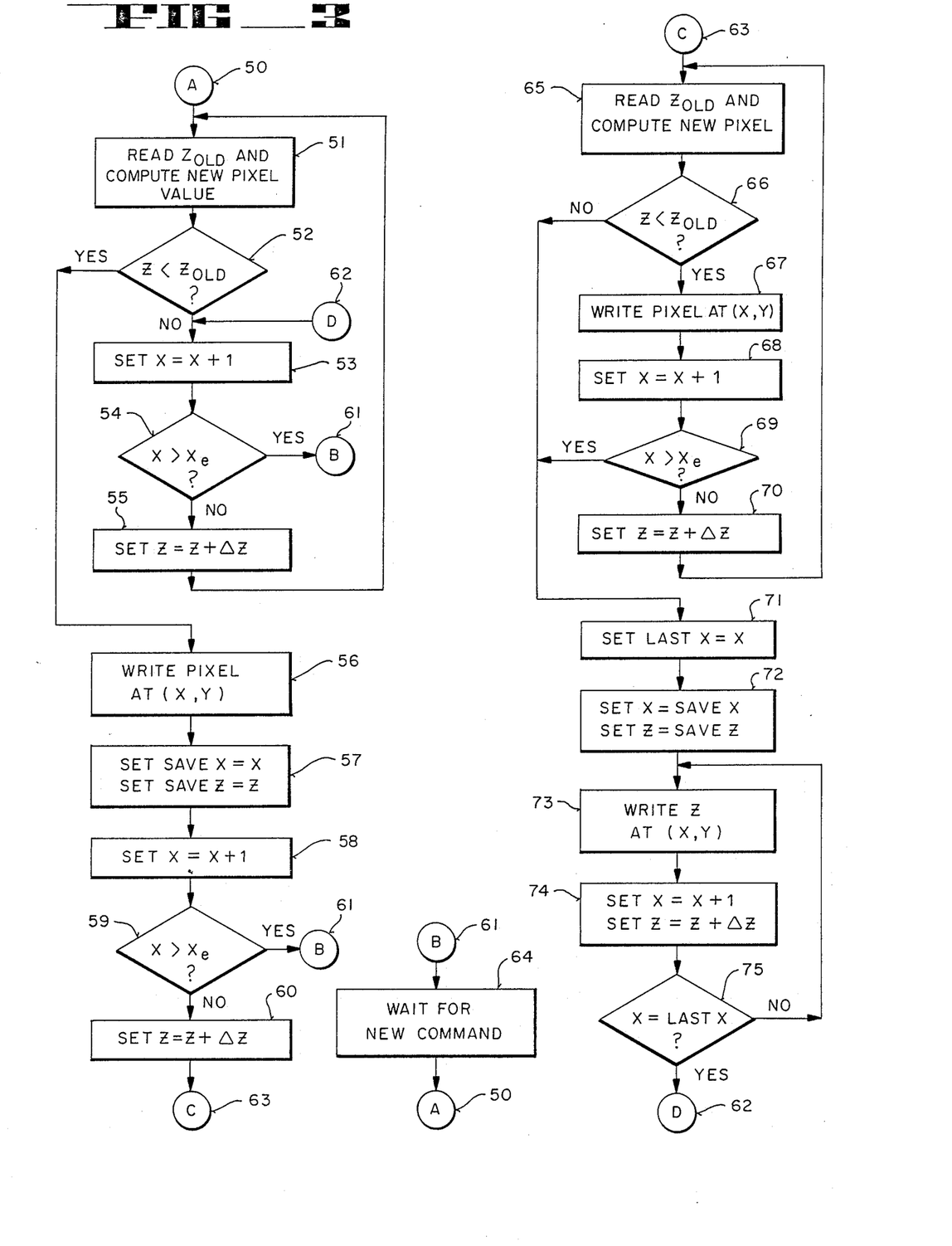
FIG. 3 is a detailed flow chart of the method of the present invention.

The method of the present invention is depicted in FIG. 3 by a detailed flow chart. The method involves a process for updating the Z-buffer with new Z values to replace old Z values in order to permit the presentation of a 3-dimensional representation of an image on a video display apparatus to an observer. Before describing the detailed steps as shown in FIG. 3, a general description of the method will be provided. The method of the invention is utilized in a raster scan, computer controlled video display system which includes a Z-buffer for storing Z values and a frame buffer for storing the pixel values. The new pixel value and new Z value for each pixel location is calculated or received and then the old Z value for that particular pixel location is retrieved from the Z-buffer and compared with the new Z value to determine whether the new pixel is in front of or behind the old pixel. Rather than updating the Z-buffer after each Z comparison, the Z-buffer is updated only after determining the existence of a contiguous (uninterrupted) group of pixel locations along a scan line in which the new pixel values are in front of the old pixel values. The frame buffer will be updated after each Z comparison when there is a pass condition for the Z comparison. Specifically, according to the present invention, the first update pixel location is determined, which location indicates where to begin an updating of the Z-buffer with new Z values for the contiguous group of pixel locations having a pass condition (when the new pixel value is in front of the old pixel value). Except for the case of the first pixel location in a scan line, the step of determining the first update pixel location includes determining when two consecutive first and second Z comparisons for a first and second pixel location produce a fail (old pixel in front of new pixel) and a pass condition respectively. The second pixel location will be the first update pixel location where updating of the Z-buffer will begin. The case of the first pixel location in a scan line (i.e. $X=1$) is a special circumstance in this step of determining the first update pixel location. In this circumstance, if the Z comparison for the first pixel location ($X=1$) is a pass condition, then that first pixel location is the first update pixel location. According to the method of the present invention, the last update pixel location is next determined, which pixel location indicates where to end the updating of the Z-buffer. Except for the case of the last pixel location in a scan line, the step of determining the last update pixel location includes determining when two consecutive third and fourth Z comparisons for a third and fourth pixel location respectively produce a pass and a fail condition respectively. The third pixel location is the last update pixel location. The case of the last pixel location in a scan line is a special circumstance in this step of determining the last update pixel location. In this circumstance, if the Z comparison for the last pixel location in a scan line is a pass condition, then that last pixel location is the last update pixel location. After determining the first update pixel location and the last update pixel location the Z-buffer is updated with new values for the contiguous group of pixel locations from and including the first update pixel to and including the last update pixel location.

The method of the present invention will now be described in detail in conjunction with FIG. 3 and FIG. 5. FIG. 5 shows the screen 200 of a video display apparatus; an imaginary orthogonal coordinate system has been superimposed on the screen 200 to illustrate the principles of the invention. In particular, X axis 201, Y axis 202, and Z axis 203, which each originate from the origin 204, are shown in FIG. 5. A scan line along the raster scan of the electron beam (assuming a conventional CRT video monitor is used) is shown labelled with reference numeral 205. The Y location for that scan line 205 is identified as $Y_0$. Two surfaces 206 and 207 are shown in FIG. 5; an observer viewing the screen 200 as shown in FIG. 5 would understand that a 3-dimensional representation is being presented in which the surface 207 is at least partially in front of surface 206, thereby obscuring a portion of surface 206, as shown in FIG. 5. The updating of the Z-buffer will typically operate line by line as the main CPU through bus 6 provides graphics data and commands to the graphics update controller 25 on a line by line basis to permit each line to be updated into the frame buffer 10 and the Z-buffer 11 as necessary and then displayed using conventional, well known video refresh techniques to provide pixel values across bus 17 to the video display apparatus.

Prior to beginning the process of the present invention, the Z-buffer 11 and the frame buffer 10 are initialized as in the prior art by setting each Z value in the Z-buffer to its maximum value (and hence the farthest possible position away from the observer) and by setting each pixel in the frame buffer at its background color (e.g. black). The main CPU then processes each surface to be displayed on the video display apparatus by breaking up the surface into pixels and determining where lines should be drawn, the color of the lines, the intensity thereof, etc. The main CPU then determines the beginning and ending points of the line and the change of the color and intensity of the pixels through the line and provides that graphics data to the graphics update controller 25.

The method of the invention begins at node A, which is labelled numeral 50. The first step following that node is step 51 in which the old Z value for the starting pixel location $X_s$ is read from Z-buffer 11 by ALU and control unit 3 which sends the address for that Z value and certain control signals, such as RAS and CAS, over the address and control bus 29. The Z value from the Z-buffer 11 will appear on the Z data bus 27 and be stored in memory 4. Also in step 51, the new pixel value for the starting pixel location $X_s$ is determined (in this initial case, the pixel value for $X_s$ is typically stored in the registers 2 and hence will be retrieved from registers 2 without further calculation). In the initial case, the new Z value will also be typically stored in registers 2 (and hence will be retrieved from registers 2 without further calculation). After the old Z value is read in step 51, the old Z value is compared to the new computed Z value in step 52. That comparison determines whether the new pixel is in front of (i.e. pass condition) or behind (i.e. fail condition) the old pixel. If the old pixel is in front of the new pixel, then the old pixel will be less than the new pixel and result of step 52 will be NO. On the other hand if the new pixel is in front of the old pixel, then the new pixel will be less than the old pixel and the result of step 52 will be YES in which case the process proceeds to step 56 which will be described further below. If the result of step 52 is NO the process proceeds to step 53 in which the current X value is set at X+1 (i.e. the X value is incremented by 1 to move the process to the next pixel location along the current scan line). In the next step according to the process of the invention, the graphics update controller 25 determines whether the current pixel location represented by X is greater than the ending X location which is the end of the current line being drawn (represented by $X_e$). If the $X_e$ value has been exceeded then the result of step 54 will be YES and the process will proceed to node B, labelled reference numeral 61. Node B proceeds to a wait state, shown as step 64 in which the graphics update controller 25 waits for a new command via bus 6 from the main CPU. Upon receiving that new command, the graphics update controller proceeds back to node A. If the result of step 54 is NO, the next step 55 is performed, in which the current Z value is set equal to Z+delta Z. This step 55 calculates the new Z value for the pixel location calculated in step 53. It will be recalled that the graphics update controller receives with each command to draw a span along a scan line, certain graphics data which includes the starting pixel value and the starting coordinates ($X_s$, $Y_s$, $Z_s$) and the ending pixel location value represented by $X_e$ along the span and the average change (delta Z) in the Z value from pixel to pixel, and the average change in pixel values from pixel to pixel along the entire span from $X_s$ to $X_e$. Delta Z and delta pixel represent the incremental change in the Z and pixel values respectively, which incremental change is typically, but not necessarily, constant throughout an entire span. Following step 55, the process returns back to the beginning of step 51 in which the old Z value for the next pixel location is read and the new pixel value for that pixel location is calculated (the new pixel value is calculated by adding delta pixel to the preceding pixel value; the preceding pixel value should be stored in the memory 4 during the calculation of the current pixel value). It can be seen that if the new Z values for the line being drawn are equal to (i.e. no change in the depth of the line) or greater than the old Z values, the process will continue to circulate through the loop containing steps 52, 53, 54 and 55 until the pixel location exceeds the $X_e$ location value, in which case the process proceeds to node B as described above.

If the new Z values represent pixels which are in front of old pixels, the process proceeds from step 52 to step 56 in which the new pixel value is written at the current pixel location represented by X and Y. It will of course be understood that, while calculating and updating new pixel and Z values over a scan line, the Y value will be constant. After step 56, the process proceeds to step 57 in which the variable Save X is set equal to the current value of X and the variable Save Z is set equal to the current value of Z. It will be appreciated that these variables and the current values for X and Z may be stored in the memory 4. It will also be appreciated that the ALU and control unit 3 provides the arithmetic and logic controls which, in conjunction with the memory 4, the registers 2 and the program storage 26, implement the process shown in FIG. 3. Following step 57, the current pixel location represented by the X coordinate is incremented by 1 in step 58 to move the processing to the next pixel location. Next, in step 59 the process determines whether the current pixel location represented by the current value of X exceeds the value of $X_e$. As before if that is the case, the ALU and control unit 3 idles in step 64 in which it waits for a new command from the main CPU via bus 6. If in step 59 it is determined that the current pixel location is less than the $X_e$ pixel location, the process proceeds to step 60 in which the current Z value is incremented by delta Z, and then the process proceeds to node C which is identified by reference numeral 63. It will be understood that the nodes shown in FIG. 3 are for purposes of more easily depicting the process of the present invention.

The process from node 3 proceeds immediately to step 65 in which the ALU and control unit 3 of the graphics update controller 25 applies an address over the address and control bus 29 to obtain, via bus 27, the old Z value for the current pixel location. Also in step 65, the new pixel value for the current pixel location (X) will be calculated by the ALU and control unit 3. The old Z value obtained in step 65 may be stored in the memory 4 which will then be used in conjunction with the ALU and control unit 3 to compare in step 66 the new Z value (just computed in step 60 by the ALU and control unit 3) with the old Z value just read from the Z buffer 11. From step 66, it can be seen that if the new Z value is less than the old Z value then step 67 follows. If, on the other hand the new Z value is not less than the old Z value then step 71 follows, which will described in further detail below.

Returning to step 67 the ALU and control unit 3 causes the writing of the current pixel value into the frame buffer 10 by applying address and control signals over the address and control bus 30 while also applying the new pixel value over pixel data bus 28 which is coupled to the frame buffer 10. The address applied over address and control bus 30 will be the address for the current pixel location; such address generation is a conventional, well known technique which is utilized in the prior art graphics update controller 1 and in the graphics update controller 25. Following the writing of the new pixel value into the frame buffer 10 in step 67, the process continues with step 68 in which the current pixel location (represented by X) is incremented by 1. In step 69, which follows, the current pixel location is compared to the $X_e$ pixel location value. If that comparison proves true (i.e. the current pixel location is greater than $X_e$) then the process proceeds to step 71. If the test in step 69 is false (NO) then the current Z value is incremented by delta Z in step 70 which incremental addition is performed by the ALU and control unit 3 which then stores the current Z value in the memory 4. Following step 70, the process recirculates back to the beginning of step 65 in which, for the next pixel location, the old Z value is read from the Z-buffer 11 and the new pixel is computed by the ALU and control unit 3. As long as new pixels are written for a span having an end which does not exceed the value $X_e$, the process recirculates repeatedly through steps 65, 66, 67, 68, 69 and 70. As soon as a new pixel is found behind an old pixel the process will leave the recirculating loop (i.e. the loop formed by steps 65, 66, 67, 68, 69 and 70) and enter the Z-buffer updating routine which is comprised of steps 71, 72, 73, 74 and 75. The Z-buffer update subroutine begins in step 71 in which the variable Last X is set to the current pixel location. In the next step, step 72, the variable X is set equal to the value of the variable Save X and the variable Z is set equal to the value of the variable Save Z. It will be recalled that the variables Save X and Save Z were determined in step 57, in which step the first update pixel location (i.e. Save X) is determined and saved. Similarly, in step 71, the last update pixel location is determined. In the case of step 71, the last update pixel location is the pixel immediately preceding the pixel location represented by the value of the variable Last X.

Following step 72, the process proceeds to step 73 in which the new Z value is written at the first update pixel location. Step 74 follows, in which the current pixel location is incremented by 1 to move to the next pixel location and the Z value is incremented by delta Z. In step 75, it is determined whether the current value of the pixel location (represented by X) is equal to the variable Last X which will be the first pixel after the last update pixel. If the result of that test is false (NO) then from step 75, the process recirculates back to step 73 to write the next updated Z value into the Z-buffer 11. The updating of the Z-buffer continues through steps 73, 74 and 75 for the contiguous group of pixel locations beginning at the first update pixel location and ending at the last pixel location. The last update pixel location will be the pixel immediately preceding the pixel represented by pixel location Last X. As soon as step 75 proves true (YES) the process moves to node D (identified by reference numeral 62) which immediately follows into step 53 and the process continues as described above.

Figure 4:
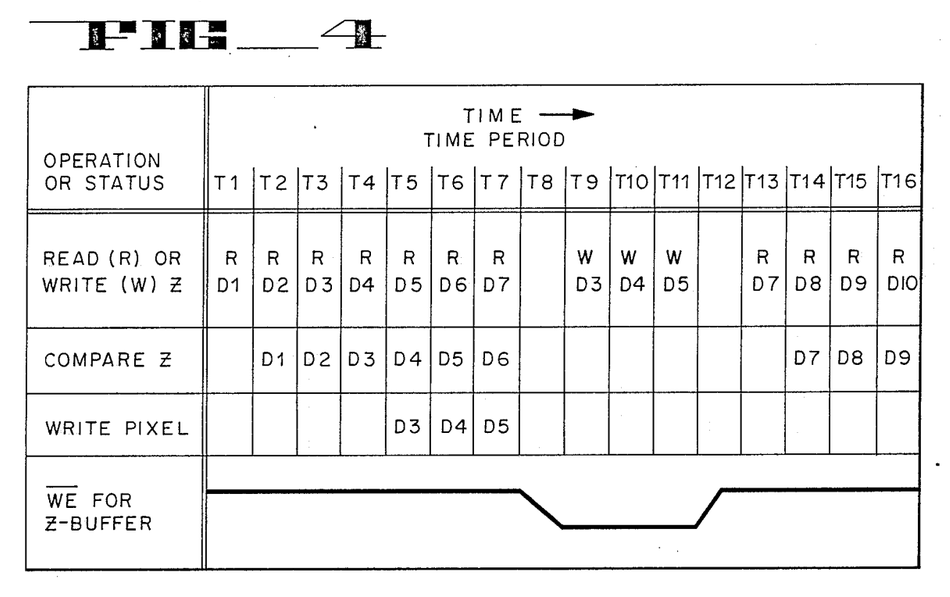
FIG. 4 is a time/space diagram showing the status or operation of the various components in FIG. 2 over time.

The method of the present invention will now be described with reference to FIG. 4 which will demonstrate the overlapping nature of the operations which permit faster Z-buffer updating. The left column of FIG. 4 shows the operation or status of certain items in FIG. 2. Specifically, the first row shows the status of reading or writing of the Z-buffer 11. The second row shows the status of the comparison of Z values performed by the ALU and control unit 3. The third row shows the status of writing pixels to the frame buffer 10. The fourth row shows the status of the write enable (active low, and hence writing only when low) signal for the Z-buffer.

Referring again to FIG. 4, it can be seen that at time T1 the Z value for the pixel D1 will be read from the Z-buffer but no other operation occurs which is shown in FIG. 4. In time T2 the old Z value for the pixel D1 is being compared with the new Z value for the pixel location D1 while at the same time the Z value for the next pixel location D2 is being read from the Z-buffer 11. In the particular example shown in FIG. 4, the pixels D3, D4 and D5 will pass the Z comparison and all other pixels shown fail the Z comparison. Thus, in time T3 the new pixel value for pixel location D1 will not be written since for pixel location D1 the Z comparison failed. During time T3, the old Z value for the pixel D3 will be read from the Z-buffer 11 while the old Z value for pixel location D2 will be compared with the new Z value for that pixel location. In time T4, the old Z value for the pixel location D4 will be read from the Z-buffer 11 while the ALU in control unit 3 compares the old Z value for the pixel location D3 with the new Z value for the that pixel location. Since the Z comparison for the pixel location D2 failed, there is no writing of a new pixel value in time T4. However, in time T4 the Z comparison determines that there is a pass condition for the pixel location D3. This Z comparison signifies that the pixel location D3 is the first update pixel location because the preceding Z comparison yielded a fail condition while the present Z comparison yielded a pass condition.

In the next time frame, time T5, three operations will occur substantially simultaneously. That is, the Z value for the pixel location D5 will be read from the Z-buffer while the old Z value for the pixel location D4 will be compared with the new Z value for the pixel location D4 (and a pass indication is again indicated). Also substantially simultaneously, the pixel value for the pixel location D3 will now be written into the frame buffer 10. Time T6 is similar to time T5 and again involves a reading from the Z buffer, a comparison of the Z values for the preceding pixel location and a writing of the pixel value for the location preceding the pixel location concurrently involved in Z comparison. In time T7, the last update pixel position (D5) is determined when a fail condition occurs for the pixel location D6. While the Z comparison produces a fail condition (which is immediately subsequent to a pass condition and hence indicates the determination of the last update pixel location) the new pixel value for pixel location D5 is being written into the frame buffer 10. During time T8, the write enable signal switches states from a reading state to a writing state to permit the Z-buffer to be updated (i.e. written to with new Z values). During times T9, T10 and T11 the Z-buffer is updated with the new Z values for the new pixel values which were written in time frames T5, T6 and T7. In time T12 the write enable signal for the Z-buffer is changed back into the reading state to make the Z-buffer ready for the next time frames. Times T13, T14, T15 and T16 proceed in the normal course described with reference to D1, D2 because no updating of the Z-buffer will be required.

The foregoing invention has been described with reference to certain specific details which were presented for a thorough understanding of the invention. It will be appreciated that numerous modifications and applications may be made of the present invention without departing from the scope and spirit of the claims which follow.

I claim:

1. In a raster scan, computer controlled video display system for presenting an image to an observer, said system having a Z-buffer for storing Z values and a frame buffer for storing pixel values, a method for updating said Z-buffer with new Z values to replace old Z values comprising:

calculating a new pixel value and a new Z value for each pixel location in a plurality of pixel locations, each of said pixel locations having an old Z value and an old pixel value being stored respectively in said Z-buffer and in said frame buffer, said Z values representing a relative distance to said observer of a pixel displayed on said video display system;

performing a Z comparison for each new Z value by comparing said old Z value with said new Z value for each pixel location, said Z comparison being performed sequentially in one direction through said plurality of pixel locations, said Z comparison producing a fail condition for a particular pixel location when the old Z value at said particular pixel location represents a pixel being closer to said observer than the new pixel at said particular pixel location, said Z comparison producing a pass condition for said particular pixel location when the new pixel at said particular pixel location is closer to said observer than the old pixel being represented by said old Z value;

updating said Z-buffer only after the Z comparison produces a combination of a fail condition for a current pixel location subsequent to producing a pass condition for a pixel location immediately preceding said current pixel location, said pixel location immediately preceding said current pixel location being a last pixel location in a contiguous group of pixel locations having a pass condition, said Z-buffer being updated for the contiguous group of pixel locations having a pass condition, which contiguous group ends with the pixel location immediately preceding said current pixel location.

2. The method of claim 1 wherein said computer controlled video display system has a separate means for communicating with said Z-buffer and a separate means for communicating with said frame buffer.

3. In a raster scan, computer controlled video display system for presenting a 3-dimensional representation of an image to an observer on a video display apparatus, said system having a Z-buffer for storing Z values and having a frame buffer for storing pixel values, a method for updating said Z-buffer with new Z values to replace old Z-values comprising:

receiving a new pixel value and a new Z value for each pixel location in a plurality of pixel locations, each of said pixel locations having an old Z value and an old pixel value being stored respectively in said Z-buffer and said frame buffer, said Z values representing a relative distance to said observer of a pixel displayed on said video display apparatus;

performing a Z comparison for each new Z value by comparing said old Z value with said new Z value for each pixel location, said Z comparison being performed sequentially in one direction through said plurality of pixel locations, said Z comparison producing a fail condition for a particular pixel location when the old Z value at said particular pixel location represents a pixel being closer to said observer than the new pixel at said particular pixel location, said Z comparison producing a pass condition for said particular pixel location when the new pixel at said particular pixel location is closer to said observer than the old pixel being represented by said old Z value;

determining a first update pixel location, said first update pixel location being the location of where to begin an updating of said Z-buffer with new Z values for a contiguous group of pixel locations having a pass condition, said step of determining the first update pixel location including determining when two consecutive first and second Z comparisons for a first and a second pixel location produce a fail and a pass condition respectively, said second pixel location being said first update pixel location;

determining a last update pixel location, said last update pixel location being the location of where to end said updating of said Z-buffer, said step of determining the last update pixel location including determining when two consecutive third and fourth Z comparisons for a third and fourth pixel location produce a pass and a fail condition respectively, said third pixel location being said last update pixel location;

updating said Z-buffer with the new Z values for said contiguous group of pixel locations after determining said last update pixel location, said updating being performed for all Z values having pixel locations from and including said first update pixel location to and including said last update pixel location.

4. The method of claim 3 wherein said computer controlled video display system has a separate means for communicating with said Z-buffer and a separate means for communicating with said frame buffer.

* * * * *